United States Patent
Kwon et al.

(10) Patent No.: US 8,409,540 B2
(45) Date of Patent: Apr. 2, 2013

(54) PROCESS FOR PREPARING HYDROTALCITE

(75) Inventors: Oh Young Kwon, Seoul (KR); Im Sun Her, Gyeongsangnam-Do (KR)

(73) Assignee: Oh Young Kwon, Seoul (KR)

( * ) Notice: Subject to any disclaimer, the term of this patent is extended or adjusted under 35 U.S.C. 154(b) by 141 days.

(21) Appl. No.: 13/127,459

(22) PCT Filed: Nov. 17, 2008

(86) PCT No.: PCT/KR2008/006753
§ 371 (c)(1),
(2), (4) Date: May 3, 2011

(87) PCT Pub. No.: WO2010/061983
PCT Pub. Date: Jun. 3, 2010

(65) Prior Publication Data
US 2011/0212014 A1    Sep. 1, 2011

(30) Foreign Application Priority Data

Nov. 3, 2008 (KR) ........................ 10-2008-0108262

(51) Int. Cl.
*C01B 31/30* (2006.01)
(52) U.S. Cl. .......... 423/420.2; 502/11; 502/84; 423/115
(58) Field of Classification Search ............... 423/420.2, 423/115; 502/11, 84
See application file for complete search history.

(56) References Cited

U.S. PATENT DOCUMENTS

2004/0219089 A1   11/2004   Kuhlmann et al.

FOREIGN PATENT DOCUMENTS

| JP | 2002-293535 A | 10/2002 |
|---|---|---|
| JP | 2003-026418 A | 1/2003 |
| JP | 2008-121023 A | 5/2008 |
| KR | 10-2001-0034281 A | 4/2001 |
| KR | 10-2003-0028666 A | 4/2003 |
| KR | 10-2005-0010610 A | 1/2005 |
| KR | 10-2006-0130644 A | 12/2006 |
| KR | 100775602 B1 | 11/2007 |
| WO | 2010-061983 A1 | 6/2010 |

OTHER PUBLICATIONS

Machine English translation of JP2008-121023.*
International Search Report and Written Opinion, International Application No. PCT/KR2008/006753, Dated July 16, 2009.

* cited by examiner

*Primary Examiner* — Steven Bos
*Assistant Examiner* — Richard M Rump
(74) *Attorney, Agent, or Firm* — Knobbe, Martens, Olson & Bear, LLP

(57) ABSTRACT

Disclosed is a method of preparing hydrotalcite having superior anion exchange capability and heat stability by forming a seed so that $CO_3^{2-}$ ions are located to be maximally stable between Mg—Al layers and then conducting primary crystallization and secondary crystallization.

8 Claims, 5 Drawing Sheets

[Figure 1]
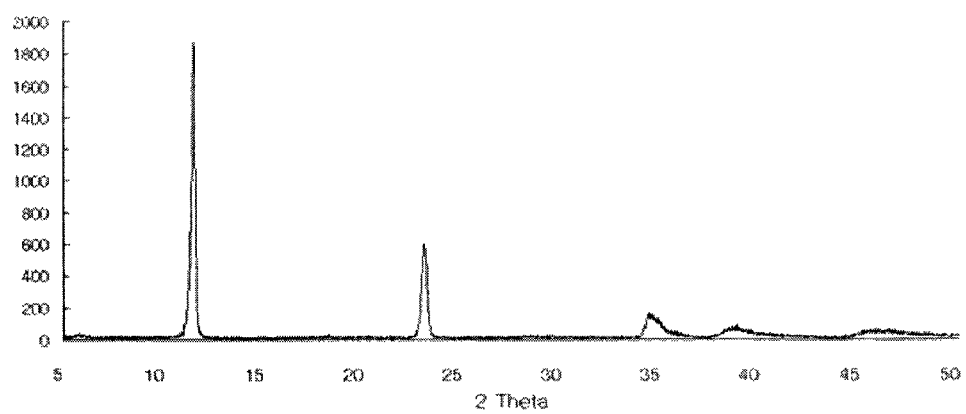

[Figure 2]
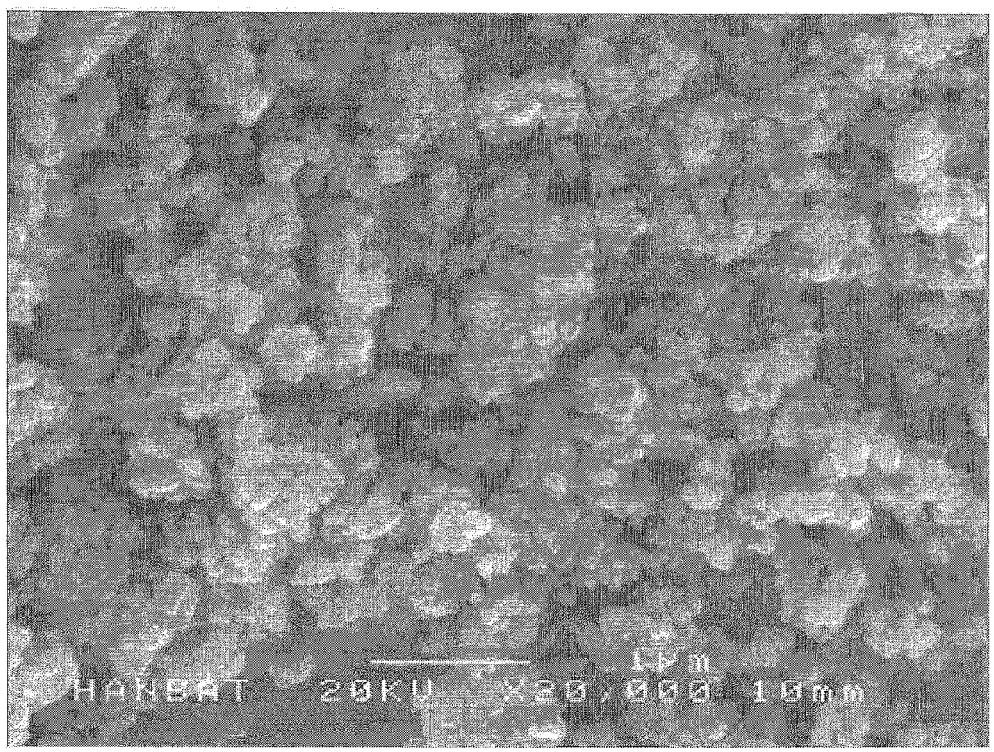

[Figure 3]
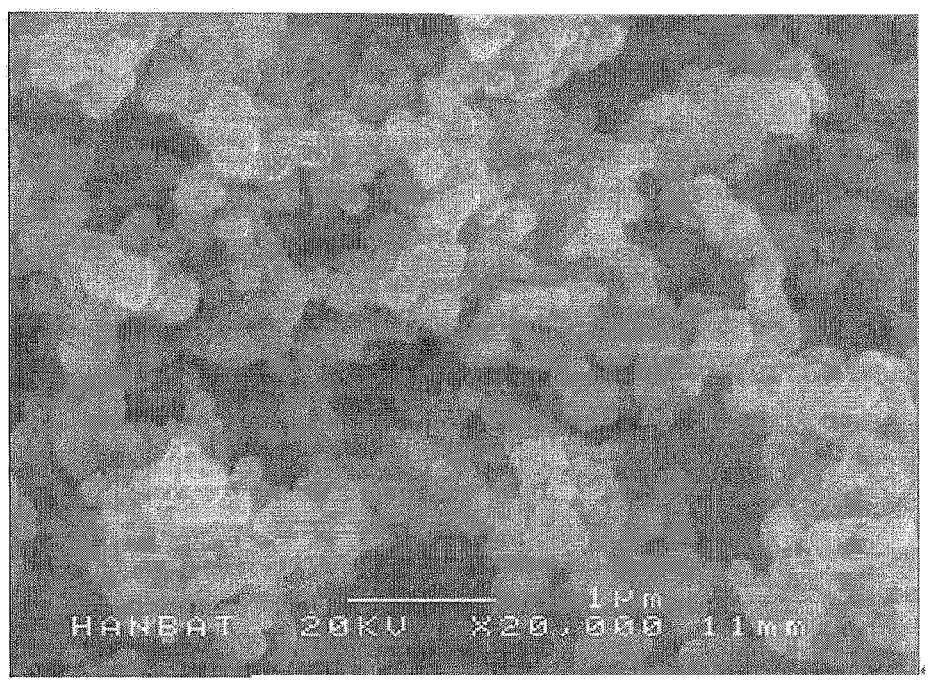

[Figure 4]
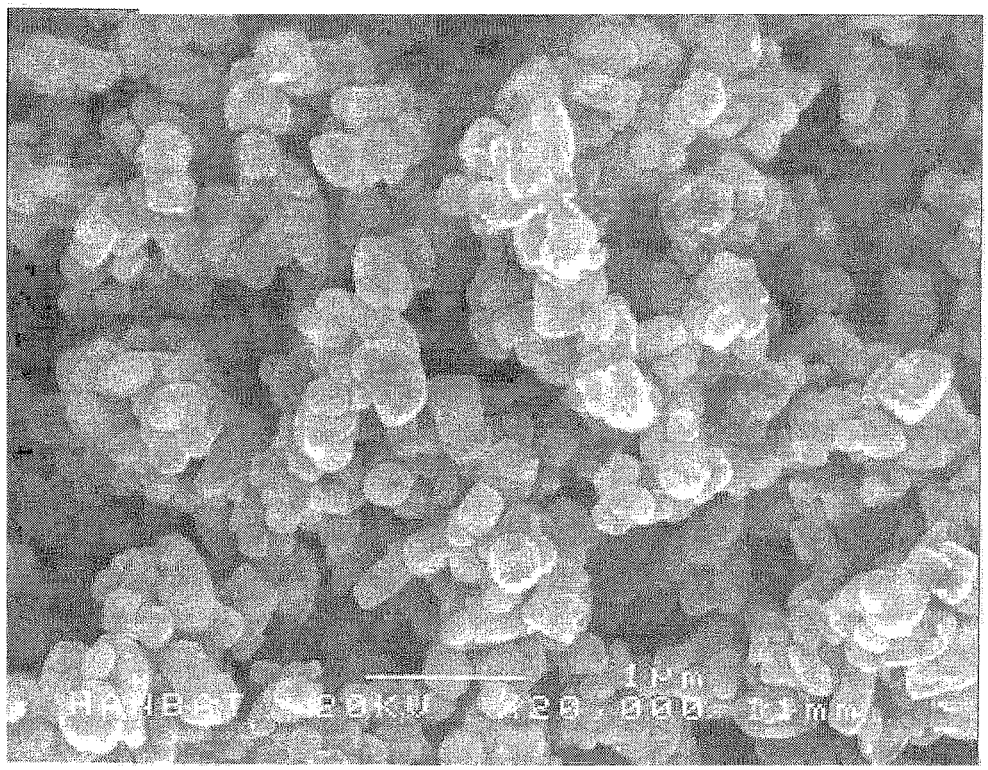

[Figure 5]

| time | Example 1 | Comparative Example 1 | Commercial Product (Alcamizer) |
|---|---|---|---|
| 0 min | | | |
| 20 min | | | |
| 40 min | | | |
| 60 min | | | |
| 80 min | | | |
| 100 min | | | |
| 120 min | | | |

PROCESS FOR PREPARING HYDROTALCITE

TECHNICAL FIELD

The present invention relates to a method of preparing hydrotalcite.

BACKGROUND ART

Because polyvinyl chloride (PVC), which is inexpensive and has superior processability and is thus used as general-purpose plastics in various fields, is unstable to heat and light, hydrochloric acid is released from the molecular chain of PVC as soon as thermal decomposition begins in a forming process. In order to prevent hydrochloric acid from being released, a heat stabilizer is utilized. The heat stabilizer plays a role in capturing hydrochloric acid which continuously accelerates deteriorative reaction, thus stabilizing vinyl chloride.

The heat stabilizer which is mixed with resin is a compound for allowing the physical and chemical properties of resin to be retained during use of processed and finished products. Examples of the heat stabilizer of PVC include a lead stabilizer, an organotin stabilizer, a fatty acid metal salt stabilizer, etc.

The lead stabilizer has superior electrical insulating properties, weatherability and heat stability and is relatively inexpensive and is thus used in various fields including electrical wire coating, hard pipe, PVC tile, and PVC fitting, etc. However, the use of lead which is toxic is restricted from the environmental point of view. Further, because of a recent increase in the price of lead, the price advantage thereof is lost.

The organotin stabilizer has high transparency and heat stability and thus may be used alone without additional treatment. However, tin has no external activity and causes sulfur pollution problems by cadmium or lead or particular odors of sulfur compounds and therefore limitations are imposed on the use thereof from the environmental point of view, and further, tin is expensive. Examples of the organotin stabilizer include monodibutyl tin, monodioctyl tin, etc.

The fatty acid metal salt stabilizer is composed mainly of fatty acid metal salts including Ba, Ca, Cd, Pb and Zn as metal species. The metal species are not used alone, and may be used in combinations of two or more thereof, for example, Ba—Cd, Ba—Zn, and Ca—Zn. The Ba—Ca stabilizer is responsible for capturing hydrochloric acid and imparting heat stability owing to reproduction of a Zn salt through reaction with $ZnCl_2$. The Ba—Cd stabilizer is a stabilizer having superior heat stability and high transparency, but the use thereof is restricted in many countries attributable to problems of cadmium that is a heavy metal. The Ba—Zn stabilizer has relatively good heat stability and transparency and is thus used for whole soft PVC products, and further, it is suitable for paste resin processing and has lower toxicity than the Ba—Cd stabilizer, thus facilitating a tendency to substitute for the Ba—Cd stabilizer. Because the Ca—Zn stabilizer is non-toxic, environmentally friendly and inexpensive, it is mainly used for food packaging materials, toys, food containers, and medical instruments but has inferior heat stability to other stabilizers. To solve this problem, the Ca—Zn stabilizer may be used together with an assistant stabilizer or in a large amount. However, the use of the large amount of Ca—Zn stabilizer may negatively affect the properties of products.

Hence, with the goal of solving the problems of the aforementioned heat stabilizers, thorough research has been conducted. In particular, hydrotalcite stabilizers are under intensive study.

Hydrotalcite, which is represented by $[Mg_6Al_2(OH)_{16}CO_3 \cdot 4H_2O]$, functions as a heat stabilizer through ion exchange of $CO_3^{2-}$ ions, which are located between Mg—Al layers, with halogen ions.

Hydrotalcite is commercially synthesized in high purity and may be applied in various fields, including environmental pollutant scavengers, catalyst inactivators, acid scavengers, acid adsorbents, halogen adsorbents, flame retardants, assistant flame retardants, enhancers for increasing heat resistance stability of polymer, acid neutralizers, UV blocking agents, heat insulation agents, and chlorine-resistant agents.

Examples of the preparation of hydrotalcite include 1) a co-precipitation process using a water-soluble meal salt and 2) a hydrothermal synthesis process at high temperature under high pressure using poorly soluble metal oxide. Prior techniques thereto include Korean Patent Registration No. 10-454273 which discloses a method of preparing hydrotalcite using polyhydric alcohol and polyhydric alcohol ester or a metallic substituent, and Korean Patent Registration No. 10-601016 which discloses a method of preparing nano-sized hydrotalcite which is Mg—Al layered double hydroxide. Also, Korean Patent Registration No. 10-775602 discloses a method of preparing hydrotalcite having a uniform particle size, including preparing an admixture of water-soluble metal salt, an alkaline compound and a dispersant, mixing the admixture with first metal hydroxide, second metal hydroxide and an interlayer anion source and dispersing the mixture, and aging the dispersed mixture at a reaction temperature of 150~250° C. under reaction pressure of 5~30 $kgf/cm^2$ for a period of time ranging from 20 min to 5 hours.

However, the method of preparing hydrotalcite disclosed in the above patents adopts a one-step synthesis method, and therefore it is difficult to maximize heat stability. Accordingly, there is a need for methods of preparing hydrotalcite able to maximize heat stability.

DISCLOSURE

Technical Problem

Leading to the present invention, intensive and thorough research into methods of preparing hydrotalcite able to maximize heat stability, carried out by the present inventors aiming to solve the problems encountered in the 2-related art, resulted in the finding that a seed may be formed so that $CO_3^{2-}$ ions are located to be maximally stable between Mg—Al layers and then crystallization may be conducted, thereby preparing hydrotalcite having superior anion exchange capability and heat stability.

Technical Solution

The present invention provides a method of preparing hydrotalcite having an Mg—Al layered composite structure with superior anion exchange capability and heat stability.

DESCRIPTION OF DRAWINGS

FIG. 1 shows the results of X-ray diffractometry of hydrotalcite particles prepared through the process of preparing hydrotalcite according to the present invention.

FIG. 2 shows an electron microscope image (20,000 magnification) of the seed particles of hydrotalcite prepared through the process of preparing hydrotalcite according to the present invention.

FIG. 3 shows an electron microscope image (20,000 magnification) of the primarily crystallized particles of hydrotalcite prepared through the process of preparing hydrotalcite according to the present invention.

FIG. 4 shows an electron microscope image (20,000 magnification) of the secondarily crystallized particles of hydrotalcite prepared through the process of preparing hydrotalcite according to the present invention.

FIG. 5 shows results of measurement of heat stability of hydrotalcite prepared through the process of preparing hydrotalcite according to the present invention.

BEST MODE

The present invention provides a method of preparing hydrotalcite comprising:

1) mixing a magnesium source, an aluminum source, a carbonate ion source, and an alkali source thus preparing a mixture, and then stirring the mixture at 30~80° C. for 3~4 hours, thus forming a seed, 2) adding an alkali source to the seed, increasing a temperature to 90~150° C., and then performing a reaction for 1~12 hours while maintaining the temperature of 90~150° C., thus obtaining primarily crystallized hydrotalcite particles, 3) adding a magnesium source, an aluminum source and a carbonate ion source to the primarily crystallized hydrotalcite particles, and then performing a reaction at 90~150° C. for 1~18 hours, thus obtaining secondarily crystallized hydrotalcite particles, and 4) washing the secondarily crystallized hydrotalcite particles with distilled water and then performing drying.

Hereinafter, a detailed description will be given of the present invention.

The method of preparing hydrotalcite according to the present invention may include forming the seed and conducting primary crystallization and secondary crystallization. Specifically, in the method according to the present invention, the seed is formed so that $CO_3^{2-}$ ions are located to be maximally stable between the Mg—Al layers, after which primary crystallization and secondary crystallization are carried out, thereby preparing hydrotalcite having superior anion exchange capability.

The magnesium source used in the method according to the present invention may include, but is not limited to, one or more selected from the group consisting of magnesium chloride ($MgCl_2$), magnesium sulfate ($MgSO_4$), magnesium nitrate ($MgNO_3$), magnesium carbonate ($MgCO_3$), magnesium oxide (MgO) and magnesium hydroxide ($Mg(OH)_2$).

The aluminum source may include, but is not limited to, one or more selected from the group consisting of aluminum sulfate ($Al_2(SO_4)_3$), aluminum chloride ($Al_2Cl_3$) and aluminum hydroxide ($Al_2(OH)_3$).

The carbonate ion source may include, but is not limited to, one or more selected from the group consisting of sodium carbonate ($Na_2CO_3$), sodium bicarbonate ($NaHCO_3$) and carbon dioxide ($CO_2$).

The alkali source may include, but is not limited to, one or more selected from the group consisting of sodium hydroxide (NaOH), potassium hydroxide (KOH), lithium hydroxide (LiOH) and calcium hydroxide ($Ca(OH)_2$).

The method of preparing hydrotalcite according to the present invention is described in more detail below. That is, a 1~3 mol magnesium source, a 0.1~1 mol aluminum source, a 1~5 mol carbonate ion source, and a 10~15 mol alkali source are placed into a reactor and then stirred at 30~80° C. and preferably 40~60° C. for 3~4 hours, thus forming a seed. Thereafter, a 10~15 mol alkali source is added to the seed, a temperature is increased to 90~150° C. and preferably 100~420° C., and then a reaction is performed for 1~12 hours and preferably 5~7 hours while maintaining the above temperature, thus obtaining primarily crystallized hydrotalcite particles. Thereafter, the primarily crystallized hydrotalcite particles are added with a 1~3 mol magnesium source, a 0.1~1 mol aluminum source, and a 1~5 mol carbonate ion source and then a reaction is performed at 90~150° C. and preferably 100~120° C. for 1~18 hours and preferably 8~15 hours, thus obtaining secondarily crystallized hydrotalcite particles. Thereafter, the secondarily crystallized hydrotalcite particles are cleanly washed with distilled water and then dried at 120~180° C. for 6~15 hours. As such, the reaction may be performed under a condition in which the pH of the reactant is maintained in the alkaline range of 8~14 and preferably 12~13. If the pH is lower than 8, hydrotalcite does not accumulate or the reaction occurs sluggishly.

The reaction molar ratio (Mg/Al) of magnesium to aluminum used in the method according to the present invention is 0.5~6.0, preferably 1.0~4.0, and more preferably 1.5~3.0. If the reaction molar ratio (Mg/Al) falls outside of the above range, crystallization does not occur well and heat stability is gradually reduced.

The primarily crystallized hydrotalcite particles have an average particle size of 0.5~1.0 μm, and the secondarily crystallized hydrotalcite particles have an average particle size of 1.0~2.0 μm.

The hydrotalcite prepared through the above method can exhibit superior anion exchange capability and heat stability by forming the seed so that $CO_3^{2-}$ ions are located to be maximally stable between the Mg—Al layers and then conducting primary crystallization and secondary crystallization. Thus, the hydrotalcite thus prepared can be efficiently used as a heat stabilizer of halogen resin without reducing the properties of the resin.

MODE FOR INVENTION

A better understanding of the present invention may be obtained through the following examples which are set forth to illustrate, but are not to be construed as limiting the present invention.

EXAMPLE 1

Preparation of Hydrotalcite Through Formation of Seed

Into a 3l reactor, 355 ml of 2 mol/l magnesium sulfate ($MgSO_4$) was added, and then stirred while slowly adding 332 ml of 0.55 mol/l aluminum sulfate ($Al_2(SO_4)_3$) thereto. Further, 59 in of 3.1 mol/l sodium carbonate ($Na_2CO_3$) was slowly added thereto, and finally, 177 ml of 12.5 mol/l sodium hydroxide (NaOH) was added thereto, after which stirring was performed at 40~60° C. for 3~4 hours. During this procedure, a milky seed was formed. After the formation of the seed, 329 ml of 12.5 mol/l sodium hydroxide (NaOH) was added to the seed, a temperature was increased to 105° C., and then a reaction was performed for 6 hours while maintaining the temperature of 105° C., thus obtaining primarily crystallized hydrotalcite particles. Thereafter, 660 ml of 2 mol/l magnesium sulfate ($MgSO_4$), 617 ml of 0.55 mol/l aluminum sulfate ($Al_2(SO_4)_3$) and 110 ml of 3.1 mol/l sodium carbonate ($Na_2CO_3$) were slowly added to the primarily crystallized hydrotalcite particles and stirred. Then, a reaction was performed for 9 hours while maintaining the temperature at 105° C., thus obtaining secondarily crystallized hydrotalcite particles. Thereafter, the secondarily crystallized hydrotalcite particles were cleanly washed with distilled water and then dried at 150° C. for 12 hours. As such, the reaction was carried out under a condition in which the pH of the reactant was maintained at 12~13.

The primarily crystallized hydrotalcite particles had an average particle size of 0.5~1.0 μm, and the secondarily crystallized hydrotalcite particles had an average particle size of 1.0~2.0 μm.

The hydrotalcite particles prepared through the method according to the present invention were analyzed using an X-ray diffractometer. The results are shown in FIG. 1. The electron microscope image (20,000 magnification) of the seed particles of hydrotalcite is shown in FIG. 2, the electron microscope image (20,000 magnification) of the primarily crystallized hydrotalcite particles is shown in FIG. 3, and the electron microscope image (20,000 magnification) of the secondarily crystallized hydrotalcite particles is shown in FIG. 4.

COMPARATIVE EXAMPLE 1

Preparation of Hydrotalcite Through Formation of No Seed

Into a 3l reactor, 1,015 ml of 2 mol/l magnesium sulfate ($MgSO_4$) was placed, and then stirred while 949 ml of 0.55 mol/l aluminum sulfate ($Al_2(SO_4)_3$) was slowly added thereto. Further, 169 ml of 3.1 mol/l sodium carbonate ($Na_2CO_3$) was slowly added thereto, and finally, 506 ink of 12.5 mol/l sodium hydroxide (NaOH) was added, after which stirring was performed at 40~60° C. for 30 min. Thereafter, a temperature was increased to 105° C., and a reaction was then performed for 24 hours while maintaining the temperature of 105° C., thus obtaining hydrotalcite particles. The hydrotalcite particles thus obtained were cleanly washed with distilled water and then dried at 150° C. for 12 hours.

EXPERIMENTAL EXAMPLE 1

Heat Stability Test

In order to evaluate heat stability of hydrotalcite according to the present invention, the following test was conducted.

Each of hydrotalcite of Example 1, hydrotalcite of Comparative Example 1 and a commercial product under the name of Alcamizer available from Kyowa Chemical was mixed with PVC as halogen resin, a plasticizer [dioctyl phthalate (DOP), diisononyl phthalate (DINP)], a metal soap-type assistant stabilizer [zinc stearate (Zn-St), calcium stearate (Ca-St)], thus preparing three kinds of samples. The composition of each sample is given in Table 1 below.

TABLE 1

|  | Example 1 | Comparative Example 1 | Commercial Product (Alcamizer) |
|---|---|---|---|
| PVC | 100 g | 100 g | 100 g |
| Plasticizer (DOP, DINP) | 45 g | 45 g | 45 g |
| Metal Soap-type Assistant Stabilizer (Sn-St, Ca-St) | 2 g | 2 g | 2 g |
| Hydrotalcite | 3 g | 3 g | 3 g |

The three kinds of samples were respectively kneaded at 160° C. for 5 min using a two roll mill, thus manufacturing test pieces 1.0 mm thick. These test pieces were cut to a size of 3 cm×4 cm, after which the cut test pieces of the three kinds of samples were placed on glass substrates such that each kind of test pieces were placed on six glass substrates, respectively, and the glass substrates were then loaded into an oven at 200° C. While the glass substrates were removed from the oven at intervals of 20 min for a total of 120 min, heat stability was measured.

The results of measurement of heat stability are shown in FIG. 5.

As shown in FIG. 5, the heat stability of hydrotalcite according to the present invention could be seen to be superior to that of Comparative Example 1 and Alcamizer available from Kyowa Chemical. This is considered to be because hydrotalcite of the present invention prepared by forming the seed so that $CO_3^{2-}$ ions are located to be maximally stable between the Mg—Al layers and then conducting primary crystallization and secondary crystallization can effectively eliminate halogen ions from the halogen polymer, resulting in superior heat stability.

INDUSTRIAL APPLICABILITY

According to the present invention, the method of preparing hydrotalcite enables the preparation of hydrotalcite having superior anion exchange capability and heat stability by forming a seed so that $CO_3^{2-}$ ions are located to be maximally stable between Mg—Al layers and then conducting primary crystallization and secondary crystallization. Thus, hydrotalcite prepared through the method according to the present invention can be efficiently used as a heat stabilizer of halogen resin without reducing the properties of the resin.

The invention claimed is
1. A method of preparing hydrotalcite, comprising:
1) mixing a magnesium source, an aluminum source, a carbonate ion source, and an alkali source, thus preparing a mixture, and then stirring the mixture at 30~80° C. for 3~4 hours, thus forming a seed;
2) adding an alkali source to the seed, increasing a temperature to 90~150° C., and then performing a reaction for 1~12 hours while maintaining the temperature of 90~150° C., thus obtaining primarily crystallized hydrotalcite particles;
3) adding a magnesium source, an aluminum source and a carbonate ion source to the primarily crystallized hydrotalcite particles, and then performing a reaction at 90~150° C. for 1~18 hours, thus obtaining secondarily crystallized hydrotalcite particles; and
4) washing the secondarily crystallized hydrotalcite particles with distilled water and then performing drying.

2. The method according to claim 1, wherein the magnesium source comprises one or more selected from the group consisting of magnesium chloride ($MgCl_2$), magnesium sulfate ($MgSO_4$), magnesium nitrate ($MgNO_3$), magnesium carbonate ($MgCO_3$), magnesium oxide (MgO) and magnesium hydroxide ($Mg(OH)_2$).

3. The method according to claim 1, wherein the aluminum source comprises one or more selected from the group consisting of aluminum sulfate ($Al_2(SO_4)_3$), aluminum chloride ($Al_2Cl_2$) and aluminum hydroxide ($Al_2(OH)_3$).

4. The method according to claim 1, wherein the carbonate ion source comprises one or more selected from the group consisting of sodium carbonate ($Na_2CO_3$), sodium bicarbonate ($NaHCO_3$) and carbon dioxide ($CO_2$).

5. The method according to claim 1, wherein the alkali source comprises one or more selected from the group consisting of sodium hydroxide (NaOH), potassium hydroxide (KOH), lithium hydroxide (LiOH) and calcium hydroxide ($Ca(OH)_2$).

6. The method according to claim 1, wherein a reaction molar ratio of magnesium to aluminum is 0.5~6.0.

7. The method according to claim 1, wherein the primarily crystallized hydrotalcite particles obtained in step 2) have an average particle size of 0.5~1.0 μm.

8. The method according to claim 1, wherein the secondarily crystallized hydrotalcite particles obtained in step 3) have an average particle size of 1.0~2.0 μm.

* * * * *